(12) United States Patent
Kunz Astete et al.

(10) Patent No.: US 8,336,499 B2
(45) Date of Patent: Dec. 25, 2012

(54) FOLDABLE AQUACULTURE NET

(75) Inventors: Samuel Enrique Kunz Astete, Chiguayante Bio Bio (CL); Guillermo Alejandro Vidal Rudloff, Concepción Bio Bio (CL)

(73) Assignee: NV Bekaert SA, Zwevegem (BE)

( * ) Notice: Subject to any disclaimer, the term of this patent is extended or adjusted under 35 U.S.C. 154(b) by 561 days.

(21) Appl. No.: 12/066,780

(22) PCT Filed: Jul. 11, 2006

(86) PCT No.: PCT/EP2006/064103
§ 371 (c)(1),
(2), (4) Date: Mar. 13, 2008

(87) PCT Pub. No.: WO2007/031352
PCT Pub. Date: Mar. 22, 2007

(65) Prior Publication Data
US 2008/0202441 A1   Aug. 28, 2008

(30) Foreign Application Priority Data

Sep. 15, 2005  (EP) .................................... 05108452

(51) Int. Cl.
*A01K 61/00* (2006.01)
(52) U.S. Cl. ........................ 119/223; 119/239
(58) Field of Classification Search .................. 119/223, 119/239; 43/7, 11, 12
See application file for complete search history.

(56) References Cited

U.S. PATENT DOCUMENTS

| | | | | |
|---|---|---|---|---|
| 3,314,187 A | * | 4/1967 | Marcinkowski | 43/105 |
| 3,678,612 A | * | 7/1972 | Hendrickson | 43/66 |
| 4,143,480 A | * | 3/1979 | Bott | 43/105 |
| 4,354,325 A | * | 10/1982 | Aho | 43/105 |
| 4,482,900 A | * | 11/1984 | Bilek et al. | 343/915 |
| 4,730,411 A | * | 3/1988 | Katis | 43/105 |
| 4,864,770 A | * | 9/1989 | Serio | 43/105 |
| 4,892,059 A | | 1/1990 | Yoneyama | |
| 5,218,781 A | * | 6/1993 | Miller | 43/100 |
| 5,615,510 A | * | 4/1997 | Anderson | 43/14 |
| 5,646,198 A | * | 7/1997 | Tanaka et al. | 523/122 |
| 7,036,263 B2 | * | 5/2006 | Yang et al. | 43/11 |
| 7,594,754 B2 | * | 9/2009 | Costello | 383/4 |
| 2004/0134443 A1 | | 7/2004 | Warecki | |

FOREIGN PATENT DOCUMENTS

| | | |
|---|---|---|
| JP | 6-284837 A | 10/1994 |
| JP | 2000032866 A * | 2/2000 |
| WO | WO 85/00726 A1 | 2/1985 |

* cited by examiner

*Primary Examiner* — Isam Alsomiri
*Assistant Examiner* — Justin Benedik
(74) *Attorney, Agent, or Firm* — Foley & Lardner LLP

(57) ABSTRACT

An aquaculture net forming an open basket has a front wall, a left side wall, a right side wall, a back wall, and a bottom. The front wall, the left side wall, the right side wall, and the bottom all preferably have the form of a rectangle. At least part of the left side wall is foldable or has been folded over a diagonal of the at least part of the left side wall and at least part of the right side wall is foldable or has been folded over a diagonal of the at least part of the right side wall, in order to facilitate transport of the aquaculture net.

17 Claims, 5 Drawing Sheets

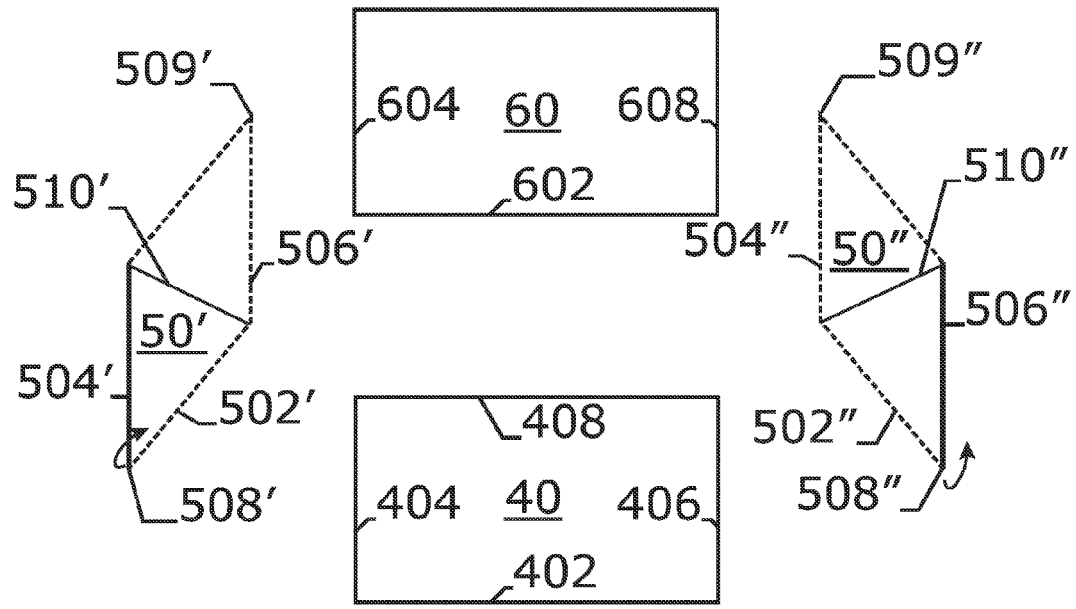
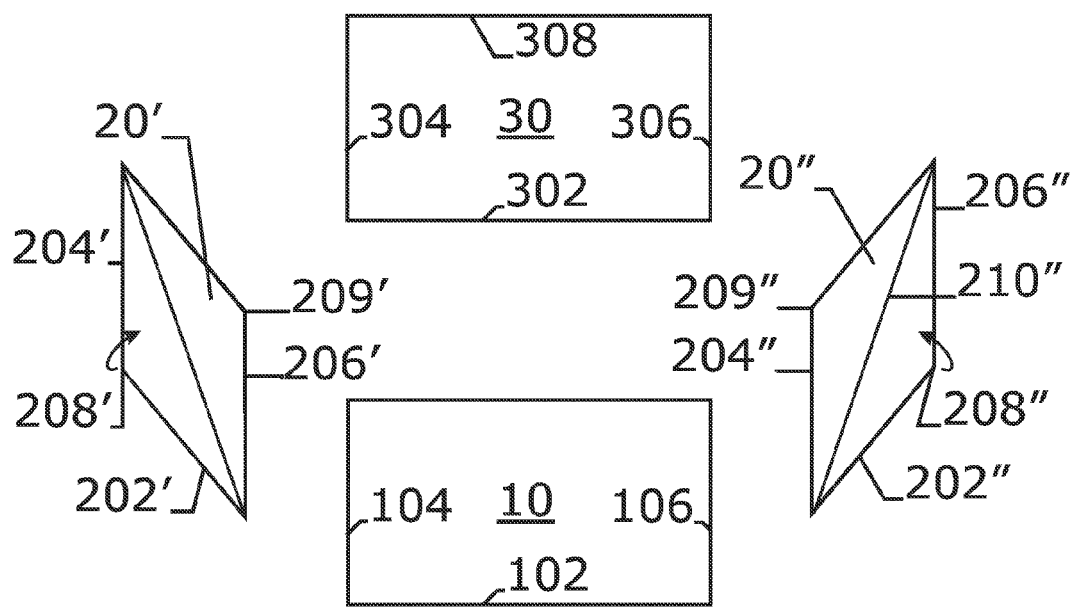
Fig. 1

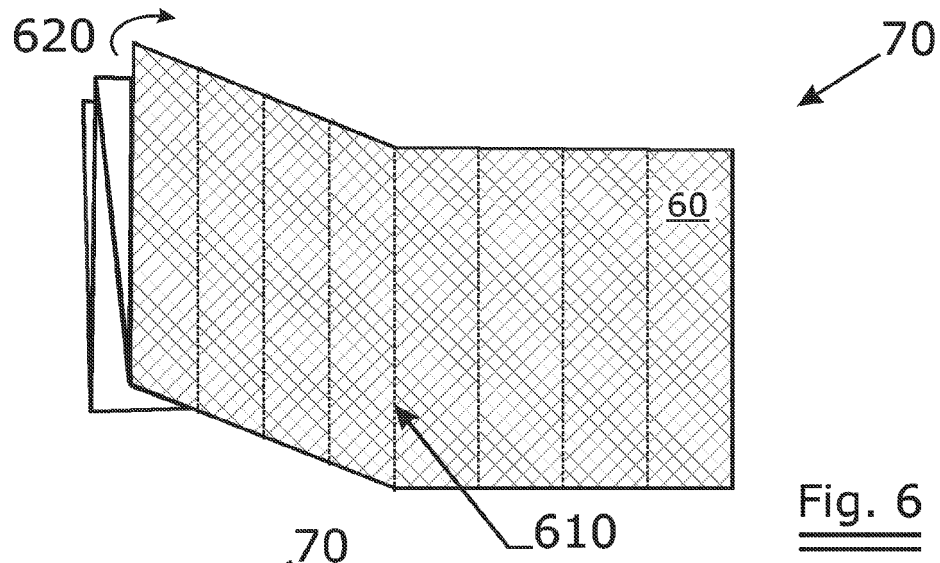
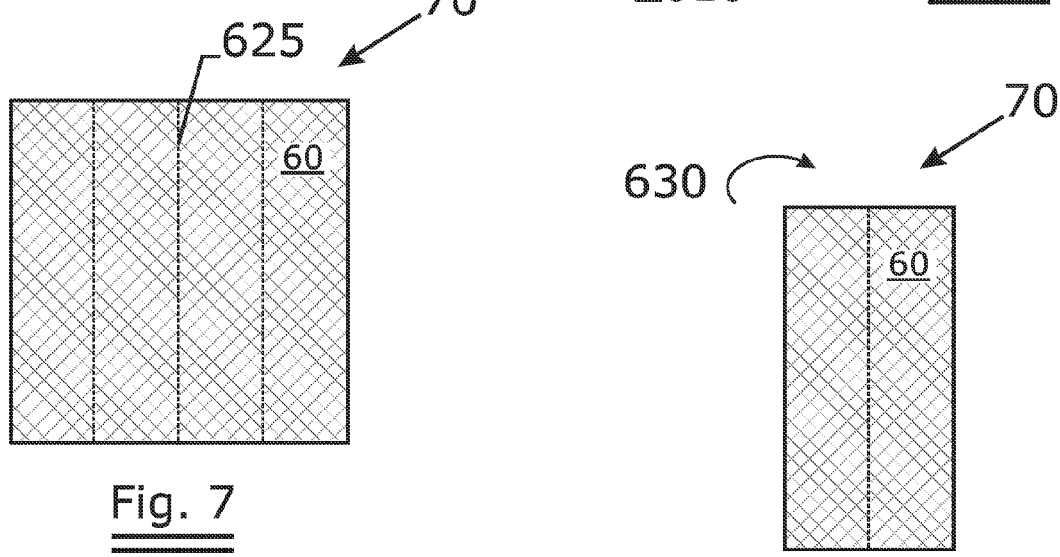
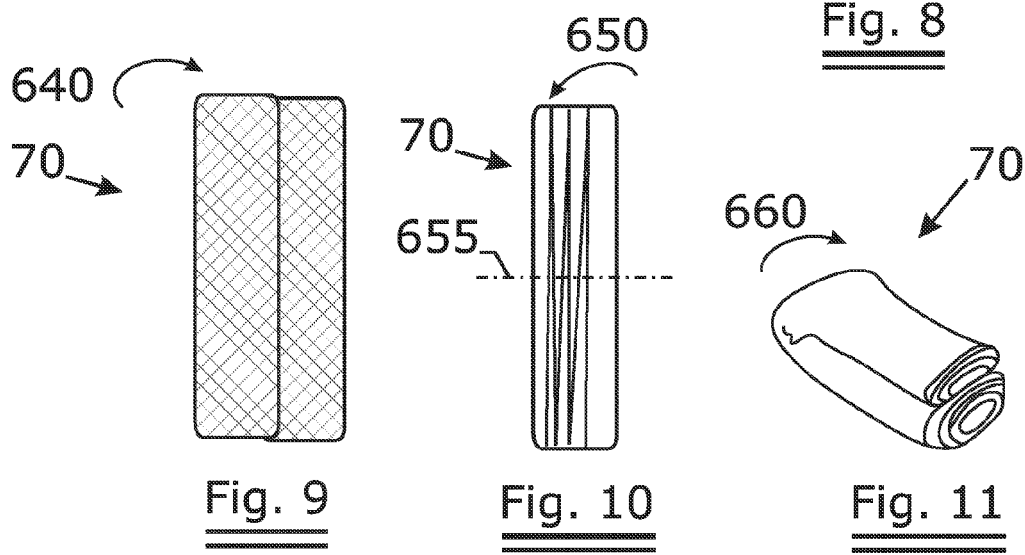

FOLDABLE AQUACULTURE NET

FIELD OF THE INVENTION

The present invention relates to an aquaculture net and to a folded aquaculture net structure.

BACKGROUND OF THE INVENTION

Aquaculture nets or fish-farming nets are used to raise aquatic life such as fish. The aquaculture net keeps the aquatic life controlled and contained and protects the aquatic life inside the net against predators such as sharks.

The dimensions of such an aquaculture net are considerable. An example of a typical dimension is 30 m×30 m×15 m, the last dimension being the depth of the net inside the water and the first two dimensions being the width and length of the net at the water surface. The net may be formed of a polymer or of a galvanized steel wire. As a matter of example only, a net made of galvanized steel wire and of the above-mentioned dimensions has a weight above 4 metric Tonnes.

These considerable dimensions and weight necessitate that assembling of the aquaculture net is done in a port with a huge crane that supports the raft structure and the complete weight of the aquaculture net. The required area for every construction of such an aquaculture net is the sum of the areas of the bottom, the side walls, the front wall and the back wall. In the above example this means an area of 30 m×30 m+4×30 m×15 m giving a total of 2700 m² only for the net.

SUMMARY OF THE INVENTION

It is an object of the present invention to avoid the problems of the prior art.

It is a further object of the present invention to provide an aquaculture net that can be assembled in an industrial site.

It is another object of the present invention to provide an aquaculture net that can be manufactured in a compact area.

It is also an object of the present invention to provide an aquaculture net that can be transported by means of a truck.

According to a first aspect of the present invention there is provided an aquaculture net in the form of an open basket comprising:
- a. a front wall;
- b. a left and a right side wall;
- c. a back wall; and
- d. a bottom.

The front wall, the left and the right side walls and the bottom all preferably have the form of a rectangle or square. At least part of the left and right side walls have been folded over a diagonal of this part, in order to facilitate transport of said aquaculture net.

An aquaculture net may have dimensions ranging from 5 m×5 m×5 m (length×width×depth) up to 30 m×30 m×30 m and more.

The net is to be made of a structure or material, which allows folding.

The net can be made of a polymer such as polyethylene, polyester or polyamide.

The net can also be made of a chain link fence of metal wires, e.g. steel wires where the steel wires are provided with a corrosion-resistant coating and/or an antifouling coating. The chain link fence structure allows some flexibility and shifting of one steel wire with respect to an adjacent steel wire. The chain link fence also allows multiple folding in one direction and some folding in other directions. The chain link fence can also be made of copper alloy wires or of titanium wires.

In a preferable embodiment of the invention, the aquaculture net also comprises one or more ropes which support the net during use and which may carry the net during transport.

According to a second aspect of the present invention, there is provided a folded aquaculture net structure comprising:
- a. a front wall;
- b. a left and a right side wall; and
- c. a back wall.

The front wall, and the left and right side walls all have preferably the form of a rectangle or square. At least part of the left and right side walls are folded over a diagonal of this part, in order to form a compact form to facilitate transport.

The front wall of the aquaculture net has a left side, a right side and a bottom side. The folded aquaculture net may be folded one or more times along lines which are parallel to the left or right side of the front wall. This folding is done in order to obtain a more compact structure suitable for transport.

Additionally, the folded aquaculture net may be folded one or more times along lines which are parallel to the bottom side of the front wall. This additional folding allows to reach an even compacter structure.

According to a third aspect of the present invention, there is provided a method of manufacturing a foldable aquaculture net. The method comprises the following steps:
- a. providing a front wall;
- b. providing a left and a right side wall;
- c. providing a back wall;
- d. providing a bottom;
- e. connecting the front wall, the left side wall, the right side wall, the back wall and the bottom to each other to form an open basket;
- f. folding at least part of the left and right side wall over a diagonal of this part.

BRIEF DESCRIPTION OF THE DRAWINGS

FIG. 1 shows various disassembled parts of an aquaculture net;

FIG. 5, FIG. 6, FIG. 7, FIG. 8, FIG. 9, FIG. 10 and FIG. 11 each show subsequent steps of folding an aquaculture net;

PREFERRED EMBODIMENTS OF THE INVENTION

Figure 2:
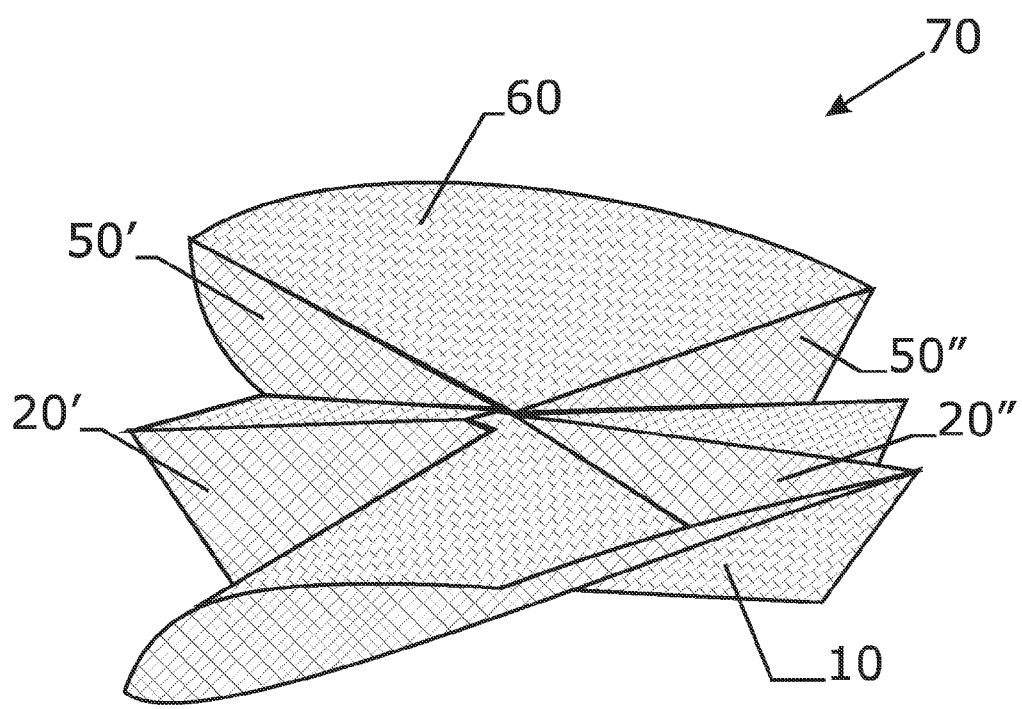
FIG. 2 and FIG. 3 each show a step of how an assembled aquaculture net is unfolded.

FIG. 1 shows various parts of an aquaculture net. These parts with their main elements are listed here:

Front wall 10 bottom side 102
    left side 104
    right side 106.
Front left side wall 20' bottom side 202'
    left side 204'
    right side 206'
    left bottom corner 208'
    right upper corner 209'
    diagonal 210'
Front right side wall 20" bottom side 202"
    left side 204"
    right side 206"

right bottom corner 208"
left upper corner 209"
diagonal 210"
First semi-bottom 30 front side 302
  left side 304
  right side 306
  back side 308
Second semi-bottom 40 front side 402
  left side 404
  right side 406
  back side 408
Back left side wall 50' bottom side 502'
  right side 504'
  left side 506'
  right bottom corner 508'
  left upper corner 509'
  diagonal 510'
Back right side wall 50"
  bottom side 502"
  right side 504"
  left side 506"
  left bottom corner 508"
  right upper corner 509"
  diagonal 510"
Back wall 60 bottom side 602
  left side 604
  right side 608

The dimensions of front wall 10, first semi-bottom 30, second semi-bottom 40 and back wall 60 are 30 m×15 m. The dimensions of the front left and right side walls 20' and 20" and of the back left and right side walls 30' and 30" are 15 m×15 m.

The aquaculture net in the form of a basket is assembled and folded as follows.

The front left and right side walls 20' and 20" are laid above the front wall 10. The right side 206' of the front left side wall 20' is connected to the left side 104 of the front wall 10. The left side 204" of the front right side wall 20" is connected to the right side 106 of the front wall 10. The front left side wall 20' is folded over diagonal 210' so that the left bottom corner 208' of front left side wall 20' is touching the right upper corner 209'. Similarly, the front right side wall 20" is folded over diagonal 210" so that the right bottom corner 208" is touching the left upper corner 209".

The first semi-bottom 30 is laid over the thus folded front left and right side walls 20' and 30'. The front side 302 of the first semi-bottom 30 is connected to the bottom side 102 of the front wall 10. The left side 304 of the first semi-bottom 30 is connected to the bottom side 202' of the front left side wall 20'. The right side 306 of the first semi-bottom 30 is connected to the bottom side 202" of the front right side wall 20".

The second semi-bottom 40 is laid over the first semi-bottom 30.

The front side 402 of the second semi-bottom 40 is connected to the back side 308 of the first semi-bottom 30.

The back left and right side walls 50' and 50" are laid over the second semi-bottom 40.

The bottom side 502' of the back left side wall 50' is connected to the left side 404 of the second semi-bottom 40. The bottom side 502" of the back right side wall 50" is connected to the right side 406 of the semi-bottom 40. The right side 504' of the back left side wall 50' is connected to the left side 204' of the front left side wall 20'. The left side 506" of the back right side wall 50" is connected to the right side 206" of the front right side wall 20". The back left side wall 50' is then folded over diagonal 510' so that the right bottom corner 508' touches the left upper corner 509'. Similarly the back right side wall 50" is folded over diagonal 510" so that left bottom corner 508" touches the right upper corner 509".

The back wall 60 is laid over thus folded back left and right side walls 50' and 50". The bottom side 602 of back wall 60 is connected to the back side 408 of the second semi-bottom 40. The left side 604 of back wall 60 is connected to the left side 506' of back left side wall 50'. Finally the right side 608 of back wall 60 is connected to the right side 504" of back right side wall 50".

The particular features of the present invention are formed by the front left and right side walls 20', 20" and the back left and right side walls 50', 50" which are folded respectively along diagonals 210', 210", 510' and 510". So both the left and right side walls are divided into two parts, a front side wall and a back side wall and each part is folded along a diagonal.

Alternative embodiments are possible. One embodiment is that the side walls are not divided into several parts and that the side walls are foldable along a diagonal crossing the whole side wall. Another embodiment is that the side walls are divided into more than two parts and that each part is foldable along one of its diagonals.

Figure 3:
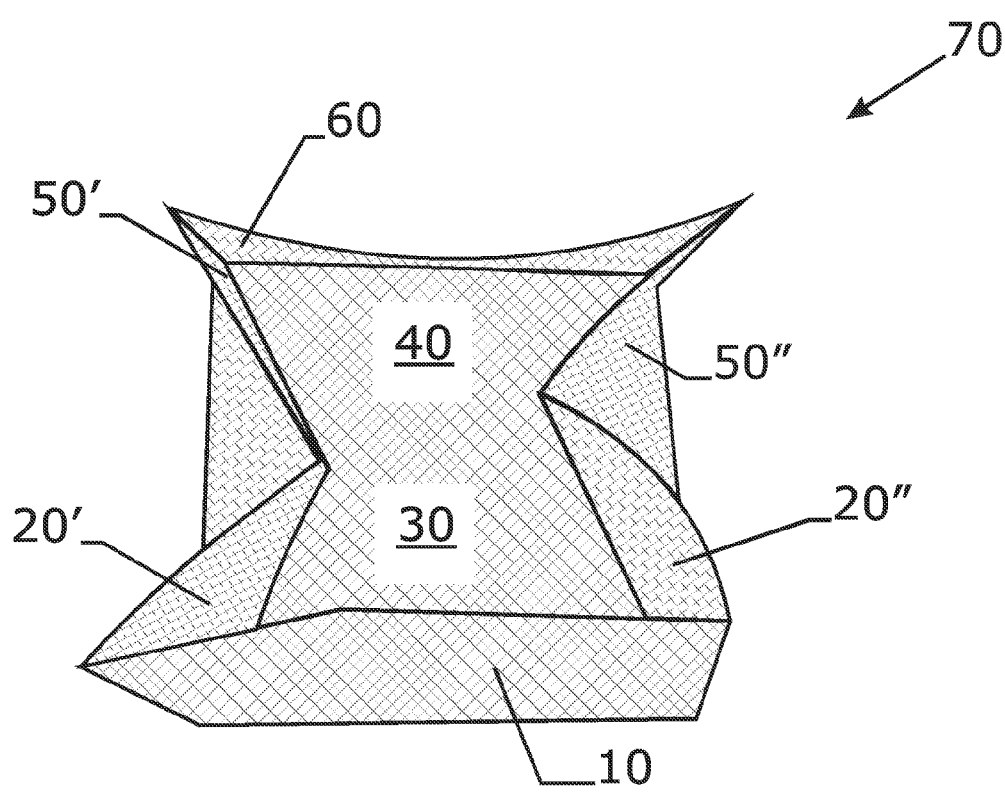

After assembling the various parts, i.e. the front wall, the side walls, the back wall and the bottom of an aquaculture net have been assembled according to the description with respect to FIG. 1, a folded aquaculture net 70 is formed and this aquaculture net 70 can be unfolded as shown in FIG. 2 and in FIG. 3 until an open basket form is reached. This unfolding is done at the site where the aquaculture or fish farming takes place.

Figure 4:
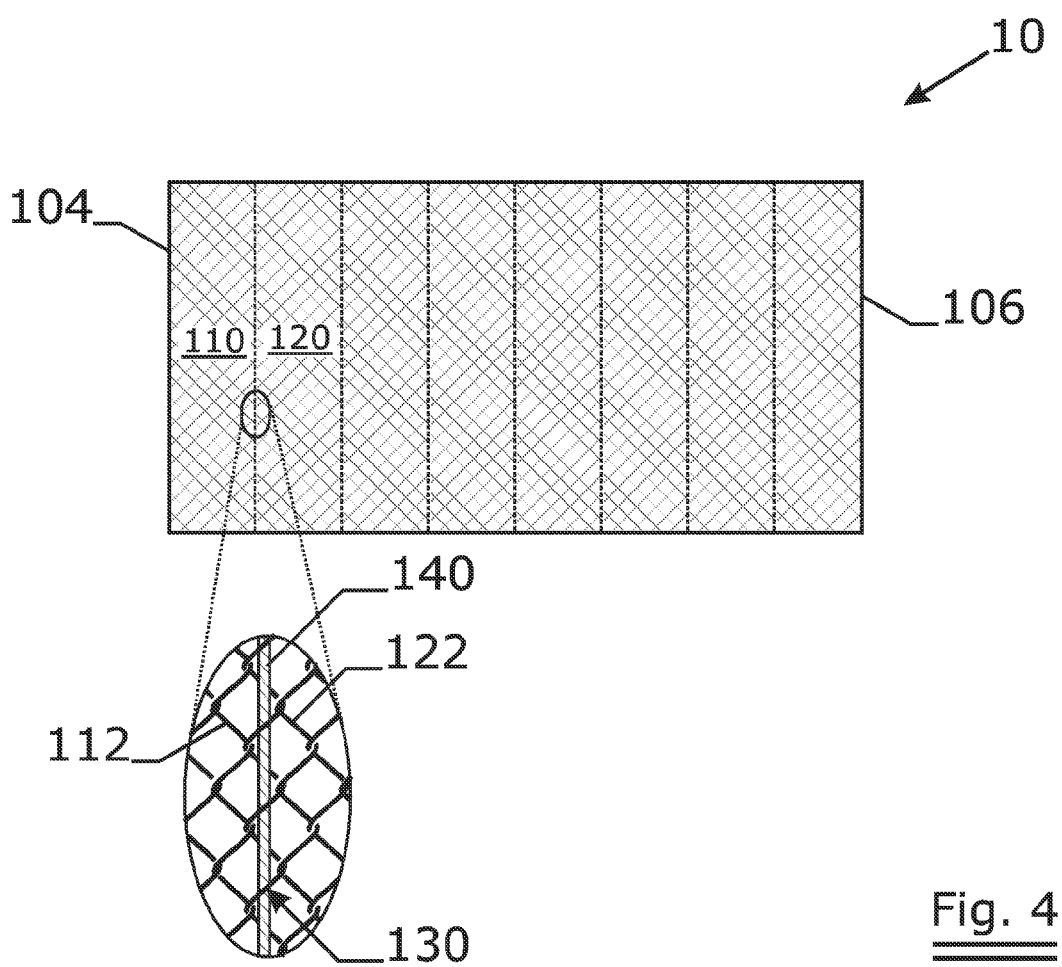
FIG. 4 shows a front wall of an aquaculture net and a way of connecting various parts of this front wall.

Reference is made to FIG. 4. The upper part of FIG. 4 schematically shows the front wall 10. As already mentioned, its sizes are 30 m×15 m. The front wall 10 is made of eight rolls 110, 120 . . . of chain link fence of 3.84 m×15 m each. Similarly the other parts of the aquaculture net 70, such as the side walls, the bottoms and the back wall, are also made of various rolls of a chain link fence.

The lower part of FIG. 4 illustrates how roll 110 is connected to roll 120. The extreme right zigzag wire 112 of roll 110 is connected to the extreme left zigzag wire 122 of roll 120 by means of a spiral shaped or helical shaped wire 130 which may have the same or another diameter as the wires in the chain link fence rolls 110 or 120.

Similar spiral shaped wires connect not only the other rolls of front wall 10, but also the rolls of other parts of the aquaculture net 70, the front wall 10 to the front left and right side walls 20' and 20", the front wall 10 to the first semi-bottom 30, the front left and side walls 20' and 20" to the first semi-bottom 30, the first semi-bottom 30 to the second semi-bottom 40, the second semi-bottom 40 to the back left and right side walls 50' and 50", the back left and right side walls 50' and 50" to the back wall 60 and the second semi-bottom 40 to the back wall 60.

Within the central hollow core of spiral shaped wire 130 a rope 140 is located. Ropes are also located between the other rolls of front wall 10 and between rolls of other parts of the aquaculture net, such as the side walls, the bottoms and the back wall. Ropes may also run diagonally across the bottom 30, 40 and be connected to the bottom 30, 40.

The ropes form the load carrying structure of the aquaculture net 70.

Figure 5:
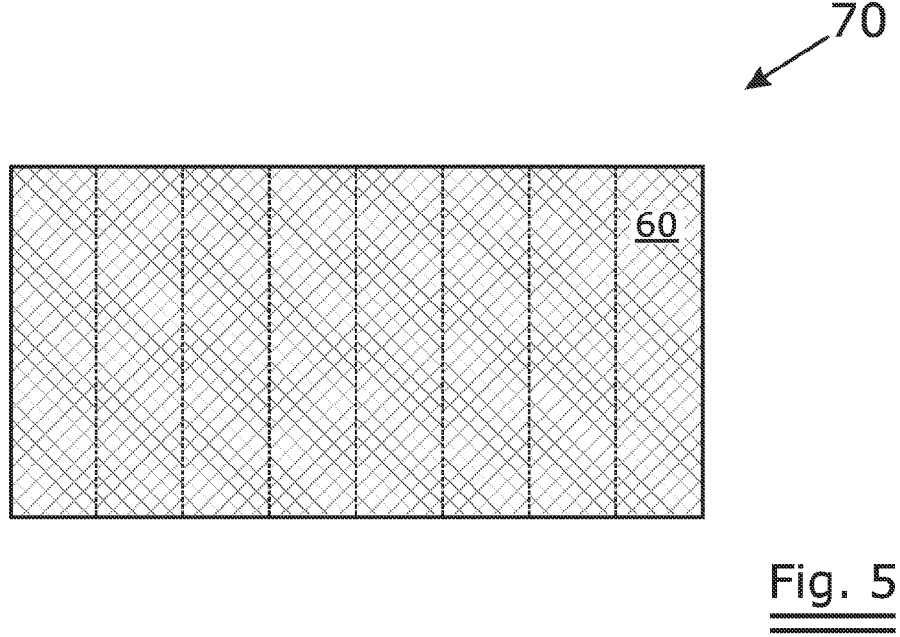

Reference is now made to FIG. 5 which illustrates schematically the folded aquaculture net 70 assembled according to the description relating to FIG. 1. What is seen is the upper part, which is formed by the back wall 60. The dimensions of this back wall 60 are the same as the dimensions of the front wall 10. These dimensions are 30 m×15 m. These dimensions are too high for allowing transportation. So the aquaculture net 70 will be folded a number of times until a compact transportable folded structure is obtained which allows transportation by means of a truck.

FIG. 6 illustrates a first step of this folding. Aquaculture net 70 is folded along line 610 in the direction of arrow 620 in order to obtain a form as illustrated in FIG. 7. The folded aquaculture net 70 of FIG. 7 has planar dimensions, i.e. those dimensions seen from above, which have been halved in comparison with the aquaculture net of FIG. 5. The dimensions of the folded structure of FIG. 7 are 15 m×15 m.

The aquaculture net 70 of FIG. 7 will now be folded again along line 625 in the direction of arrow 630 of FIG. 8, in order to halve again its planar dimensions. The planar dimensions of the aquaculture net 70 of FIG. 8 are 7.5 m×15 m.

FIG. 9 illustrates yet another folding step. One third of the aquaculture net 70 is folded in the direction of arrow 640. The thus folded aquaculture net then reaches planar dimensions of 5.0 m×15 m.

FIG. 10 illustrates the last but one folding step. The aquaculture net 70 is folded again for one third part in the direction of arrow 650. The dimensions of this folded aquaculture net 70 of FIG. 10 is 2.5 m×15 m.

FIG. 11 then illustrates the final folding step. The aquaculture net 70 is folded along line 655 of FIG. 10 in the direction of arrow 660 of FIG. 11 in order to take the form illustrated in FIG. 11. The planar dimensions of the folded aquaculture net 70 are 2.5 m×7.5 m. These are dimensions which are transportable by means of a truck. Obviously, the thickness of the folded aquaculture net has been increasing along the various folding steps.

If the aquaculture net is made of chain link fence steel wire, the various folding steps are not carried out manually but by means of a hydraulic crane.

Similarly, the unfolding steps are also carried out by means of a hydraulic crane installed on a barge. During the unfolding the net is immediately put into the water. Sufficient buoys are attached to the some of the ropes in order to avoid that the complete aquaculture net sinks. The buoys are then separated from each other so that the aquaculture net can take is unfolded form under water.

Figure 12:
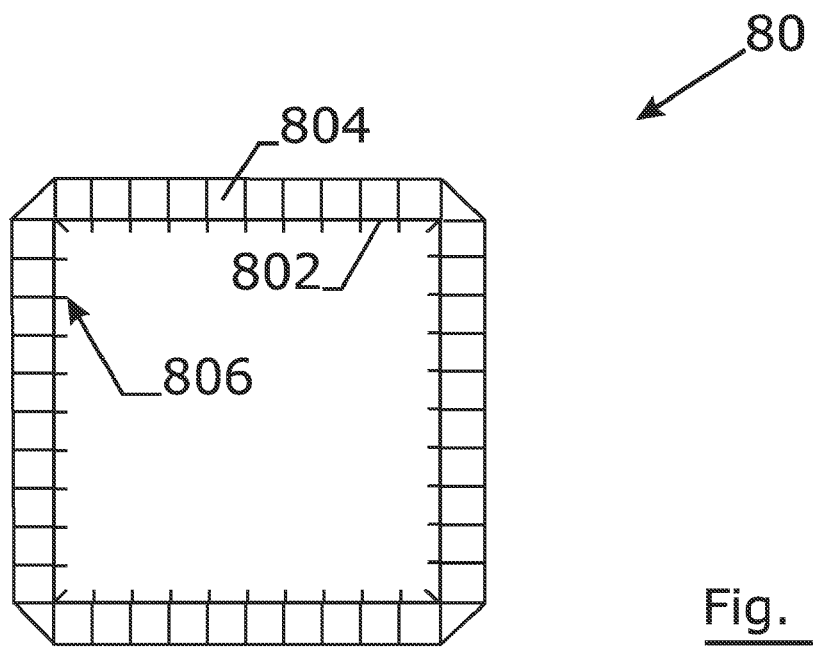
FIG. 12 and FIG. 13 each show upper views of an installed aquaculture net.
Figure 13:
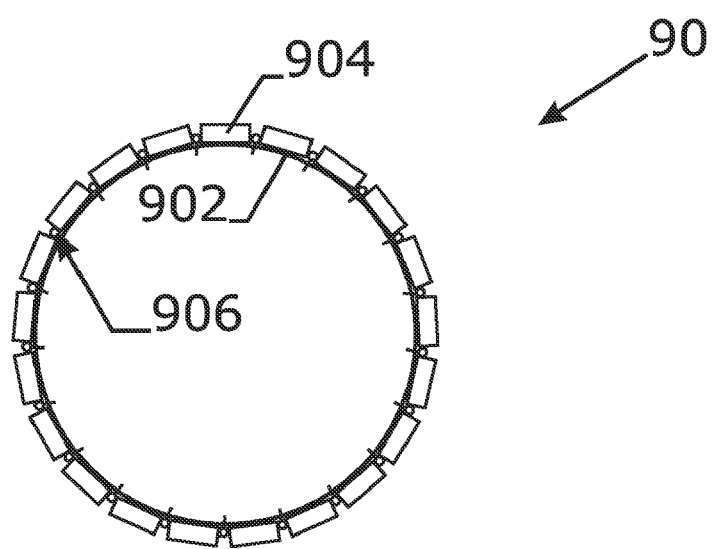

FIG. 12 and FIG. 13 illustrate how and where an aquaculture net 70 can be installed.

FIG. 12 illustrates the square embodiment of a floating support structure 80 for an aquaculture net. The floating support structure 80 comprising a connection of various hollow light weight tubes forming a raft 802 with a platform 804 connected thereto. People can walk around on the platform 804. Connected to the raft 802 are various hooks or belts 806 where the aquaculture net can be attached.

FIG. 13 illustrates the circular embodiment of a floating support structure 90 for an aquaculture net. Here again, hollow tubes form a raft 902 where a platform 904 is connected. The aquaculture net 70 can be suspended at the various hooks or belts 906. The same aquaculture net 70 as illustrated in all the previous FIGURES can be used in this circular embodiment. The bottom of the aquaculture net still has the shape of a rectangle or square and the upper side takes a form close to a circle (more precisely, the form of a polygon).

The invention claimed is:

1. An aquaculture net in a form of an open basket comprising:
a front wall, said front wall having a left side, a right side and a bottom side;
a left side wall;
a right side wall;
a back wall; and
a bottom;
wherein said front wall, said left and right side walls and said bottom all have a form of a rectangle such that the net forms a box in an uncollapsed state having an opening defined by top sides of the front, left side, right side, and back walls, the opening in the uncollapsed state having first area,
wherein the net is collapsed into a collapsed state such that:
the opening has a second area in the collapsed state that is smaller than the first area,
at least part of the left side wall is folded over a diagonal fold line of said at least part of the left side wall,
at least part of the right side wall is folded over a diagonal fold line of said at least part of the right side wall, and
each of said front wall, said left side wall, said right side wall, said back wall and said bottom is additionally folded one or more times such that visible planar dimensions of the net, as viewed from a side of the net, are substantially smaller than the visible planar dimensions of the net when uncollapsed.

2. An aquaculture net according to claim 1, wherein said net comprises a chain link fence based on metallic wire.

3. An aquaculture net according to claim 2, wherein said metallic wire has an antifouling coating, a corrosion resistant coating, or a combination thereof.

4. An aquaculture net according to claim 3, wherein said net further comprises one or more ropes configured to support the net during use or installation.

5. An aquaculture net according to claim 2, wherein said net further comprises one or more ropes configured to support the net during use or installation.

6. An aquaculture net according to claim 2, wherein said chain link fence is based on one of steel wires, copper alloy wires, or titanium wires.

7. An aquaculture net according to claim 2, wherein said chain link fence comprises zigzag wires.

8. An aquaculture net according to claim 1, wherein said net further comprises one or more ropes configured to support the net during use or installation.

9. An aquaculture net according to claim 1, wherein the net is collapsed into the collapsed state such that the at least part of the left side wall has been folded over the diagonal fold line of said at least part of the left side wall such that a diagonal fold in material of the at least part of the left side wall is created and extends an entire height of the left side wall, and wherein the at least part of the right side wall has been folded over the diagonal fold line of said at least part of the right side wall such that a diagonal fold in material of the at least part of the right side wall is created and extends an entire height of the right side wall.

10. An aquaculture net according to claim 1, wherein the net is collapsed into the collapsed state, so as to allow transportation via a truck.

11. A folded aquaculture net structure comprising:
a front wall, said front wall having a left side, a right side and a bottom side;
a left side wall;
a right side wall; and
a back wall;
wherein said front wall and said left and right side walls all have a form of a rectangle such that the net forms a box in an uncollapsed state having an opening defined by top sides of the front, left side, right side, and back walls, the opening in the uncollapsed state having first area,
wherein the net is collapsed into a collapsed state such that:
the opening has a second area in the collapsed state that is smaller than the first area, at least part of the left side wall is folded over a diagonal fold line of said at least part of the left side wall, at least part of the right side wall is folded over a diagonal fold line of said at least part of the right side wall, and each of said front wall, said left side wall, said right side wall and said back wall is additionally folded one or more times such that visible planar dimensions of the net, as viewed from a side of the net, are substantially smaller than the visible planar dimensions of the net when uncollapsed so as to allow a compact form.

12. A folded structure according to claim 11, wherein the net is collapsed into the collapsed state such that said net structure is additionally folded one or more times along lines which are parallel to the bottom side of the front wall.

13. A folded aquaculture net structure according to claim 11, wherein the net is collapsed into the collapsed state such that the at least part of the left side wall is folded over the diagonal fold line of said at least part of the left side wall such that a diagonal fold in material of the at least part of the left side wall is created and extends an entire height of the left side wall, and wherein the at least part of the right side wall is folded over the diagonal fold line of said at least part of the right side wall such that a diagonal fold in material of the at least part of the right side wall is created and extends an entire height of the right side wall.

14. A folded aquaculture net structure according to claim 11, wherein the net is collapsed into the collapsed state such that the net is transportable via a truck.

15. A method of manufacturing a foldable aquaculture net, said method comprising the following steps:

providing a front wall, said front wall having a left side, a right side and a bottom side;

providing a left side wall and a right side wall;

providing a back wall;

providing a bottom;

connecting said front wall, said left side wall, said right side wall, said back wall and said bottom to each other to form an open basket;

folding at least part of the left side wall over a diagonal of the at least part of the left side wall;

folding at least part of the right side wall over a diagonal of the at least part of the right side wall; and folding each of said front wall, said left side wall, said right side wall, said back wall and said bottom additionally one or more times in order to obtain planar dimensions, as viewed from a side of the net, that are substantially smaller than planar dimensions of the net when unfolded.

16. A method of manufacturing a foldable aquaculture net according to claim 15, wherein folding the at least part of the left side wall over the diagonal of the at least part of the left side wall creates a diagonal fold in material of the at least part of the left side wall that extends an entire height of the left side wall, and wherein folding the at least part of the right side wall over the diagonal of the at least part of the right side wall creates a diagonal fold in material of the at least part of the right side wall that extends an entire height of the right side wall.

17. A method of manufacturing a foldable aquaculture net according to claim 15, after folding said front wall, said left side wall, said right side wall, said back wall and said bottom additionally one or more times to obtain the planar dimensions that are substantially smaller than the planar dimensions of the net when unfolded, the net is compacted so as to allow transportation via a truck.

* * * * *